June 5, 1928. 1,671,991
T. LINDNER
UNIVERSAL LOCK JOINT
Filed Jan. 24, 1927
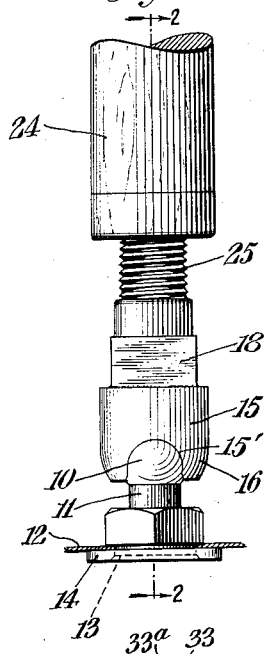
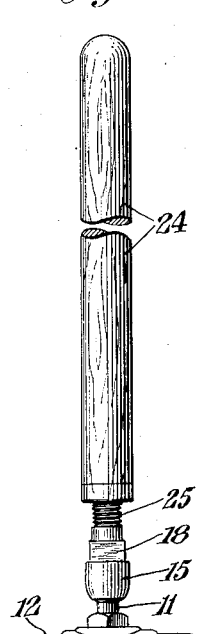
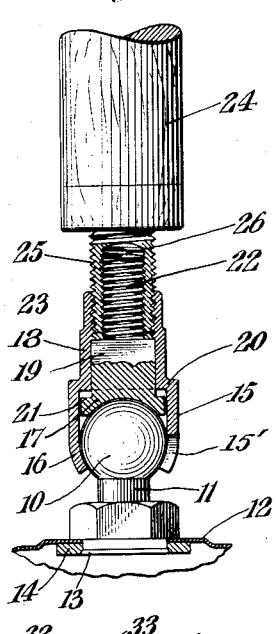
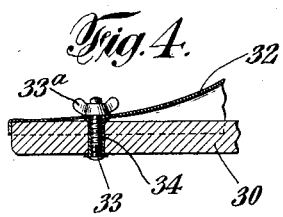
Inventor
Theodor Lindner
By his Attorneys
Dean, Fairbank, Obrieglit & Hirsch Patented June 5, 1928.

1,671,991

UNITED STATES PATENT OFFICE.

THEODOR LINDNER, OF NEW YORK, N. Y., ASSIGNOR, BY MESNE ASSIGNMENTS, TO HARRY HURESON, OF BROOKLYN, NEW YORK.

UNIVERSAL LOCK JOINT.

Application filed January 24, 1927. Serial No. 162,976.

My present invention relates to adjustable lock joints and more especially to universal lock joints of the type useful for connecting the head to the handle of an adjustable brush or broom.

It is among the objects of the invention to provide a universal lock joint which can be conveniently set in any angular relation and by which an especially secure unyielding connection is effected, without the need however for the exercise of skill or strength in tightening the same. Another object is to provide a joint of the character described devoid of protruding screws, nuts, ratchets or other irregular parts likely to become caught against adjacent objects, and devoid of any separable parts apt to become lost.

Another object is to provide a lock joint of the character set forth of rugged construction not apt to be deranged, and all of the parts of which can be readily produced mechanically without the need for skilled labor.

In the accompanying drawings in which is shown one of various possible embodiments of the several features of the invention Fig. 1 is a fragmentary side view of my lock joint, Fig. 2 is a view in longitudinal cross-section taken on line 2—2 of Fig. 1, Fig. 3 is a fragmentary view indicating the application of the joint to a brush, and;

Fig. 4 is a fragmentary sectional view through the brush.

In Figs. 1 and 2 of the drawings I have shown a universal joint comprising a ball forging 10 including a shank 11 which may be secured or constitute a part of the base or support. Illustratively, I have shown this shank secured to the metal back 12 of a brush by upsetting the protruding part 13 of the shank against a metal ring 14 lodged within a concavity of the back.

Upon the ball is provided a hollow shell member 15 which may also be a forging if desired and which is crimped inward at its rim 16 to engage the surface of the ball and to afford a free turning connection therewith, said shell member having a cutout at 15' to render the connection universal, as will be apparent.

Within the shell is a cup member 17 having a concavity complementary to the ball. Preferably the shell includes a shank part 18 encircling a corresponding shank part 19 of the cup, said shanks being angular, preferably rectangular in cross-section as shown adjacent the ball to afford a keying connection for retaining the cup member within the shell free from relative rotation. The shell affords a transverse shoulder, serving as a limiting stop for the shoulder 21 afforded by the cupped head of the cup member.

According to the present invention the tightening of the cup relative to the ball is effected by a differential thread connection. Illustratively, I have shown the shank 19 of the cup with an integral threaded nipple 22 at its outer end, and the shank 18 of the socket tapped at 23 at its outer end. The manually actuated element for tightening or adjusting the joint, illustratively shown as the handle 24 of a broom is provided with a nipple 25 having a thread to work in the tapped part 23 of the shell. The threaded nipple 22 of the cup shank is threaded into a corresponding socket 26 within the nipple 25.

The two sets of threads are oppositely directed and of differential pitch, the outer thread being preferably slightly steeper than the inner. Illustratively the outer thread may be 20 turns to the inch and the inner 24 turns to the inch.

The ball 10, the shell 15, and the cup member 19 therein constitute a pre-assembled unit, the parts of which cannot be disengaged from each other. To set or tighten the joint, the socket 26 of the handle nipple 25 is threaded onto the nipple 22 on the shank of the cup. As the threading operation progresses, the nipple 25 threads into the tapped thread 23 of the shell while the cup shank 19 threads into socket 26.

The outer thread, that is, that of the shell 18 being, however, steeper than the inner thread, that is, the thread on the nipple 22 of the cup shank, the cup 19 will advance within the socket toward the ball at the rate determined by the difference between the pitch of the outer and of the inner thread. The head of the cup 19 thus moves away from the shoulder 20 of the shell and is tightly forced against the ball 10 to grip the latter. It will be seen that for each complete turn of the handle, assuming the use of threads of the specifications previously noted, the cup advances toward the ball but 1/120 of an inch.

Thus, with a relatively small manual effort, the cup is forced into extremely tight engagement with the ball so that the joint is frictionally locked with such security as to resist effectively, thrusts considerably greater than would be encountered in the use of a broom or a brush.

Assuming the brush handle to have a diameter of one inch the user by rotating it through one complete turn thus has traversed a path of approximately three inches to cause a clamping advance of 1/120 of an inch. The mechanical advantage would thus be approximately 360, or with a manual locking force of but ten pounds there is produced a frictional clamping thrust of nearly two tons.

The joint is truly universal and admits adjustment or setting so that the shank can extend in any meridian of the ball and along any radius thereof above the ball shank. Obviously the ball and cup could be replaced by corresponding cylindrical elements, where adjustment in but one plane is required.

My lock joint is of general application. It is of utility for adjustable window fixtures, instrument supports, and the like.

In the drawings I have illustratively shown the joint applied to a brush including a wooden or molded head 30 to which the tufts 31 of the brush are connected, said head preferably enclosed by a metal back 12 to which the ball stud of the universal lock joint is attached in the manner previously described. For ready separation of the brush head in order to permit replacement thereof, when worn out or injured, I have secured the latter to the metallic back by means of a pair of threaded studs 33 within corresponding socket shells 34 through the wooden head, the ends of said studs extending through the metal back 12. A pair of wing nuts 33ª threaded upon the ends of the studs serve to tighten said wooden and metal elements together.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:

1. An adjustable lock joint comprising a pair of coacting friction members one of said members convex and the other having a complementary concavity, coaxial connectors rigid with the respective friction members and extending toward the same side thereof, said connectors having differential threads, and a handle having differential threads coacting with the respective connectors, thereby to move said complementary members toward each other in the rotation of the handle, at a rate corresponding to the differential of the threads.

2. A universal lock joint comprising a ball member, a coacting shell provided with a hollow shank, a cup member within said shell for coaction with said ball, a handle threaded into the shank of said shell, said cup member having a shank threaded into a corresponding socket in the handle end, the shell thread being of pitch higher than the cup shank thread, said threads being oppositely directed.

3. A universal lock joint comprising a ball, a shell member fitted about said ball and having a universal movement therewith, and including a hollow shank, a cup for said ball within said shell, means retaining said cup to prevent rotation thereof relative to said shell and a member including a nipple threaded into the shank of said shell, said cup having a threaded shank extending into a corresponding socket coaxially of said nipple, the threads of said shell and of said cup shank being oppositely directed and of different pitch.

4. A universal lock joint comprising a ball, a shell forging extending about said ball and inturned at its rim to permit of universal displacement relative to said ball without separation, said shell having a hollow shank including a base portion polygonal in cross-section, a solid cup member within said shell coacting with said ball, said cup member having an extension shank keyed with respect to said angular portion and threaded at its outer end, a joint tightening member having a socket threaded upon said end and including a nipple coaxial therewith and threaded into the correspondingly tapped end of said socket shank, the threads on said nipple and said socket being oppositely directed and of different pitch.

5. A universal lock joint including a ball, a shell member having a universally adjustable connection therewith, a cup within said shell coacting with said ball shank, a lock member having a threaded connection with the outer part of said shell and with the outer part of said cup member, said threaded connections being oppositely directed and of different pitch, said shell and said cup member having coacting keying parts to prevent relative rotation thereof.

6. A universal lock joint including a ball, a shell member having a universally adjustable and substantially non-separable connection with said ball, said shell having an extension, a cup member within said shell coacting with said ball and having an extension within the shell extension, said socket and said cup member being polygonal in cross-section beyond the ball to maintain them against relative rotation, and a coupling tightening member having a differential thread connection with said shell and said cup extensions.

Signed at Brooklyn, in the county of Kings, and State of New York, this 27th day of December, 1926.

THEODOR LINDNER.